No. 719,784. PATENTED FEB. 3, 1903.
L. E. GANNETT.
BRUSH CUTTER.
APPLICATION FILED SEPT. 15, 1902.
NO MODEL.
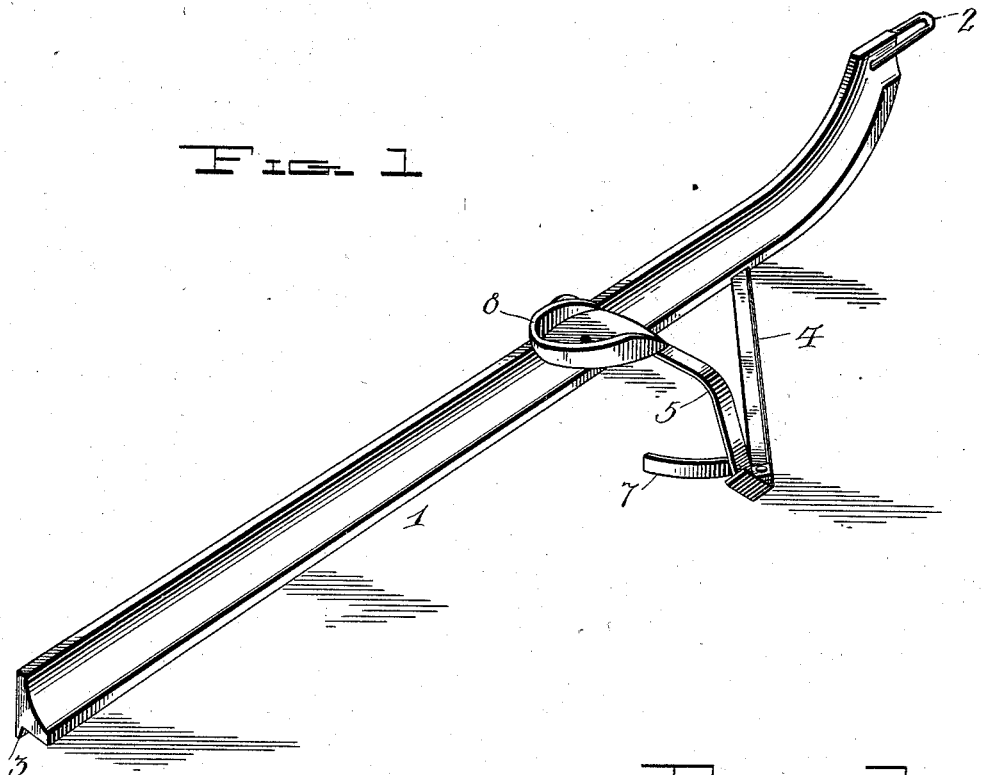
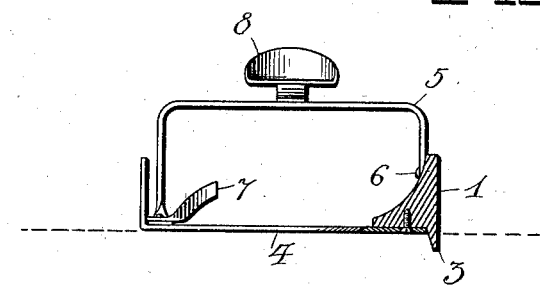
Inventor
L. E. Gannett,
Witnesses
By
Attorneys

UNITED STATES PATENT OFFICE.

LEWIS E. GANNETT, OF BELLEVUE, IDAHO.

BRUSH-CUTTER.

SPECIFICATION forming part of Letters Patent No. 719,784, dated February 3, 1903.

Application filed September 15, 1902. Serial No. 123,501. (No model.)

*To all whom it may concern:*

Be it known that I, LEWIS E. GANNETT, a citizen of the United States, residing at Bellevue, in the county of Blaine and State of Idaho, have invented certain new and useful Improvements in Brush-Cutters; and I do declare the following to be a full, clear, and exact description of the invention, such as will enable others skilled in the art to which it appertains to make and use the same.

The invention relates to a device for cutting brush and briers, leveling mole and ant hills, and smoothing off meadows and fields.

The object of the invention is to produce a device of this character which is simple in construction, durable in use, very efficient in operation, and inexpensive of production.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a perspective view of my improved brush-cutter. Fig. 2 is a cross-section through the same.

Referring more particularly to the drawings, the numeral 1 denotes a runner or shoe having its forward end turned up and provided with a ring or clevis 2, to which a draft-animal may be attached to draw the runner along the ground. The runner is provided with a longitudinal rib or flange 3 upon its bottom, which is adapted to enter the ground as the runner is drawn forward to guide the same in a straight path and prevent it from being forced sidewise when the cutting blade or knife 4 strikes a large root or other object.

The cutting knife or blade 4 is arranged at an angle to the runner, having one of its ends secured to the bottom of the runner and its outer end supported by the arched brace 5, which is secured to the runner at 6. A curved deflector 7, secured to the outer end of the brace and knife at their meeting-point, projects rearwardly and inwardly under the arched brace and deflects the brush and briers as they are cut by the knife to one side in order to leave a clear path for the device when it makes its next cut. A seat 8 for the driver is supported from the arch-brace 5.

In the operation of my device it will be understood that as the draft-animal draws the same along the knife or blade will run close to the ground and cut down all brush, weeds, briers, and other vegetable growth and will also level mole and ant hills and other uneven places upon the ground. The longitudinal rib 3 upon the runner will hold the device in a straight path and prevent the knife from slipping away from heavy brush and roots.

From the foregoing description, taken in connection with the accompanying drawings, it is thought that the construction, operation, and advantages of my improved brush-cutter will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A device of the character described comprising a runner, a cutter carried thereby, a brace for supporting said cutter, and a deflector secured to said brace, substantially as set forth.

2. A device of the character described, comprising a runner provided with a longitudinal flange adapted to enter the ground, a cutter secured to said runner, an arched brace to support said cutter, and a deflector secured to said brace, substantially as set forth.

3. A brush-cutter comprising a runner formed with a longitudinal flange upon its bottom adapted to enter the ground to prevent sidewise movement of the runner, a cutter arranged at an angle to said runner, having one end secured thereto, an arched brace carried by the runner and supporting the outer end of the cutter, and a curved deflector carried by said brace for directing the cut brush to one side, substantially as set forth.

4. A brush-cutter comprising a runner, having means on its lower side to engage the earth and direct it in a straight line, a cutter-blade extending from one side of the runner and diverging rearwardly therefrom, an arched brace connected to the runner and to the outer end of said cutter, and a deflector at the outer end of said cutter, disposed at an angle thereto, extending toward the runner and converging rearwardly thereto, substantially as described.

In testimony whereof I have hereunto set my hand in presence of two subscribing witnesses.

LEWIS E. GANNETT.

Witnesses:
 HALE BARNARD,
 LOTTE M. IDE.